(12) United States Patent
Baek

(10) Patent No.: US 12,049,139 B2
(45) Date of Patent: Jul. 30, 2024

(54) APPARATUS AND METHOD OF GENERATING VIRTUAL SHIFT EFFECT IN ELECTRIC VEHICLES

(71) Applicants: HYUNDAI MOTOR COMPANY, Seoul (KR); KIA CORPORATION, Seoul (KR)

(72) Inventor: Jong Kil Baek, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 366 days.

(21) Appl. No.: 17/410,140

(22) Filed: Aug. 24, 2021

(65) Prior Publication Data
US 2022/0169123 A1 Jun. 2, 2022

(30) Foreign Application Priority Data
Dec. 1, 2020 (KR) .......................... 10-2020-0165335

(51) Int. Cl.
*B60L 15/00* (2006.01)
*B60L 15/20* (2006.01)

(52) U.S. Cl.
CPC ....... *B60L 15/2054* (2013.01); *B60L 2240/12* (2013.01); *B60L 2240/423* (2013.01); *B60L 2240/507* (2013.01); *B60L 2250/12* (2013.01); *B60L 2250/16* (2013.01); *B60L 2250/26* (2013.01)

(58) Field of Classification Search
None
See application file for complete search history.

(56) References Cited

U.S. PATENT DOCUMENTS

| | | | |
|---|---|---|---|
| 7,522,034 B1 * | 4/2009 | Price ...................... | F16H 63/42 340/576 |
| 2015/0197195 A1 * | 7/2015 | Hera ........................ | H03G 5/16 381/86 |
| 2019/0061521 A1 * | 2/2019 | Guo ......................... | B60K 6/40 |
| 2019/0152480 A1 * | 5/2019 | Smyczynski ......... | B60W 20/15 |
| 2022/0041157 A1 * | 2/2022 | Imamura .............. | B60W 10/111 |

FOREIGN PATENT DOCUMENTS

KR 10-2019-0051451 A 5/2019

* cited by examiner

*Primary Examiner* — Adam D Tissot
(74) *Attorney, Agent, or Firm* — Lempia Summerfield Katz LLC

(57) ABSTRACT

An apparatus and method of generating a virtual shift effect in an electric vehicle are provided. The apparatus for generating a virtual shift effect in an electric vehicle includes: a driving information detector configured to detect driving information of the electric vehicle; a controller configured to determine a virtual shift point based on the detected driving information and output a control signal for generating the virtual shift effect at the determined virtual shift point; and a disconnector configured to disengage power transmission between sub-driving wheels and sub-wheel motor, wherein the disconnector is engaged or disengaged according to the control signal output, and generates an impact occurring upon the engagement or disengagement of the disconnector as the virtual shift effect.

11 Claims, 9 Drawing Sheets

FIG. 1 "PRIOR ART"
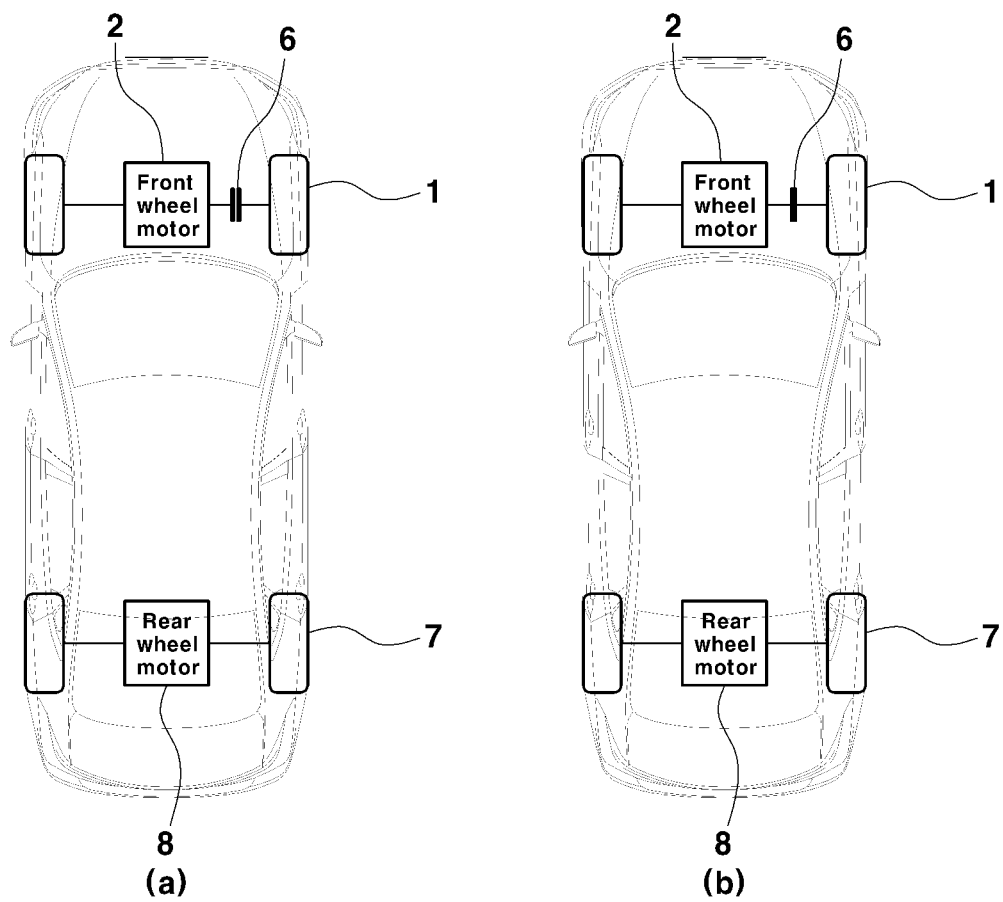

FIG. 2 "PRIOR ART"
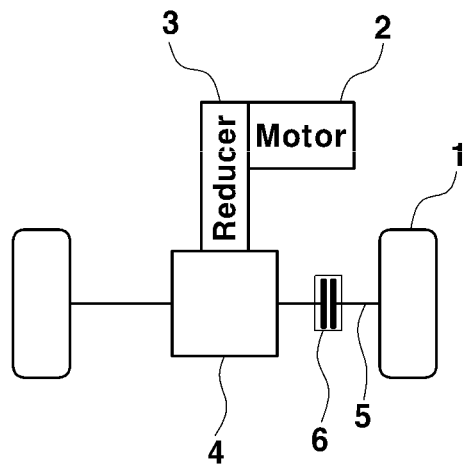
FIG. 3
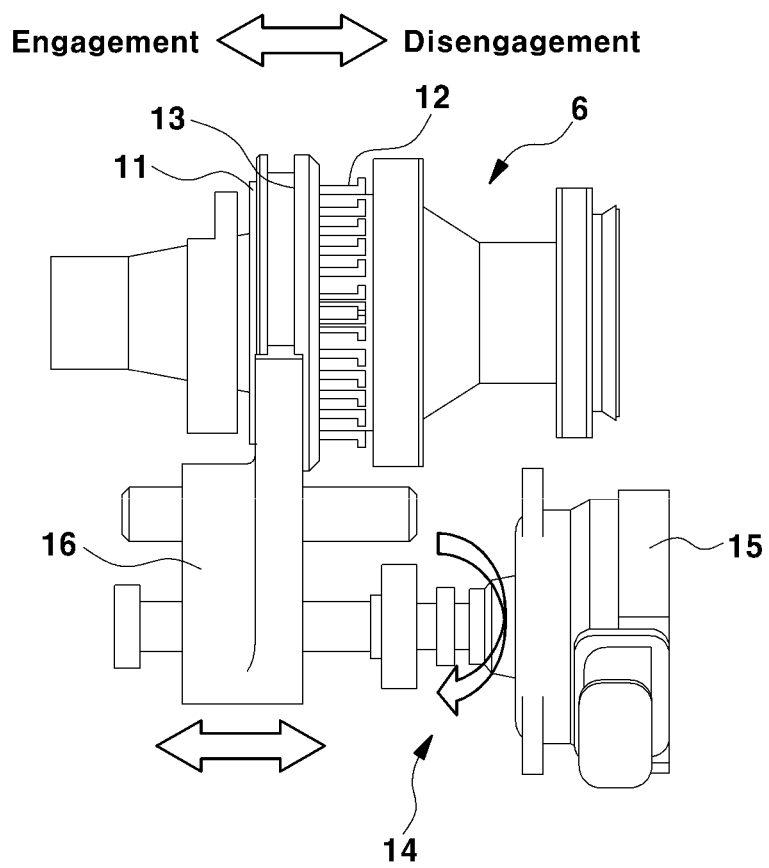

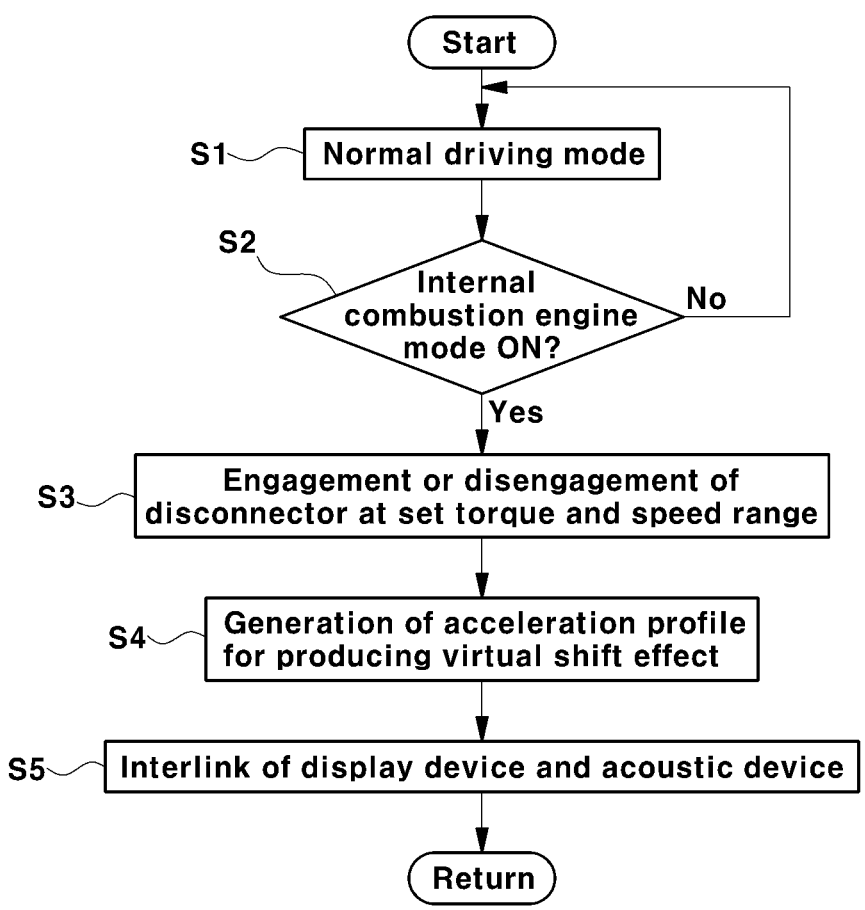

APPARATUS AND METHOD OF GENERATING VIRTUAL SHIFT EFFECT IN ELECTRIC VEHICLES

CROSS REFERENCE TO RELATED APPLICATION

This application claims priority to and the benefit of Korean Patent Application No. 10-2020-0165335, filed on Dec. 1, 2020, the entire contents of which are incorporated herein by reference.

FIELD

The present disclosure relates to an apparatus and method of implementing a virtual shift effect in an electric vehicle.

BACKGROUND

The statements in this section merely provide background information related to the present disclosure and may not constitute prior art.

As is well known, an electric vehicle (EV) is a vehicle that operates using a motor.

The drive system of such an electric vehicle includes a motor provided as a vehicle driving source, a battery connected to the motor in a chargeable or dischargeable manner to supply power to drive the motor, an inverter connected to the battery to drive and control the motor, and a reducer reducing and transmitting the rotational force to drive wheels.

The inverter serves to convert the direct current (DC) supplied from the battery to alternating current (AC) and apply AC to the motor via a power cable during the driving of the motor, and to convert AC generated from the motor to DC and supply DC to the battery, charging the battery.

In a conventional electric vehicle, unlike a conventional internal combustion engine vehicle, a multi-stage transmission is not used, and instead a reducer using a fixed gear ratio is disposed between the motor and the driving wheels.

This is because unlike the internal combustion engine, in which a distribution range of energy efficiency is wide depending on the operating point and high torque is offered only in the high-speed region, in the case of a motor, the difference in energy efficiency from the operating point is relatively small and low speed and high torque can be achieved by the characteristics of the motor alone.

However, the absence of the transmission may be advantageous in that there is no interruption in drivability due to shifting, thereby providing smooth drivability, but for drivers who enjoy driving, the absence of the transmission and therefore the shift effect generated therefrom may make the drivers feel bored.

In addition, in the case of a driver who has only driven an internal combustion engine vehicle, he/she may feel bored when driving an electric vehicle that can only provide the acceleration/deceleration effect caused by the motor without generating a shifting effect.

Accordingly, in an electric vehicle equipped with a speed reducer without a multi-stage transmission, a technology that allows the driver to feel the driving sensibility and fun, driving excitement, and the like as in an internal combustion engine vehicle equipped with a multi-stage transmission is desired.

SUMMARY

The present disclosure provides an apparatus and a method capable of generating and implementing a virtual shift effect as if it were actually generated by a multi-stage transmission in an electric vehicle without such a multi-stage transmission.

According to one form of the present disclosure, an apparatus for generating a virtual shift effect in an electric vehicle having a main-wheel motor for driving main driving wheels and a sub-wheel motor for driving sub-driving wheels includes: a driving information detector configured to detect driving information of the electric vehicle; a controller configured to determine a virtual shift point based on the detected driving information and output a control signal for generating the virtual shift effect at the determined virtual shift point; and a disconnector configured to disengage power transmission between the sub-driving wheels and the sub-wheel motor, wherein the disconnector is engaged or disengaged according to the control signal output from the controller and generate an impact occurring upon the engagement or disengagement of the disconnector as a virtual shift effect.

In another form of the present disclosure, a method of generating a virtual shift effect in an electric vehicle having a main-wheel motor for driving main driving wheels and a sub-wheel motor for driving sub-driving wheels, includes: collecting, by a controller, driving information of the electric vehicle; determining, by the controller, a virtual shift point based on the collected driving information and outputting, by the controller, a control signal for generating the virtual shift effect at the determined virtual shift point; and allowing a disconnector to be engaged or disengaged according to the control signal output from the controller to generate an impact occurring upon the engagement or disengagement of the disconnector as a virtual shift effect.

According to the present disclosure, a virtual shift effect may be generated in an electric vehicle without a transmission as if it were generated in an internal combustion engine vehicle, using the disconnector, thereby allowing the driver to feel the driving sensibility and fun, driving excitement, and the like as in an internal combustion engine vehicle equipped with a multi-stage transmission.

In addition, when the driver selects the internal combustion engine mode in an electric vehicle, the virtual shift effect as in an internal combustion engine vehicle may be generated in association with virtual sounds such as virtual engine sound, thereby providing a sporty and distinct shift effect and more realistic driving acceleration to the driver.

In addition, it is possible to enhance the virtual shift effect by allowing the virtual shift stage to be displayed through a display device such as a cluster or an audio, video, and navigation (AVN) system of a vehicle during shifting.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a view illustrating an electric vehicle equipped with a front-wheel motor, a rear-wheel motor, and a disconnector;

FIG. 2 is a more detailed view illustrating the configuration and component arrangement of a sub-wheel side power train in the electric vehicle of FIG. 1;

FIG. 3 is a view illustrating the configuration of the disconnector used for generating a virtual shift effect according to one form the present disclosure;

FIG. 12 is a flowchart illustrating a process of generating a virtual shift effect according to another form of the present disclosure.

Figure 4:
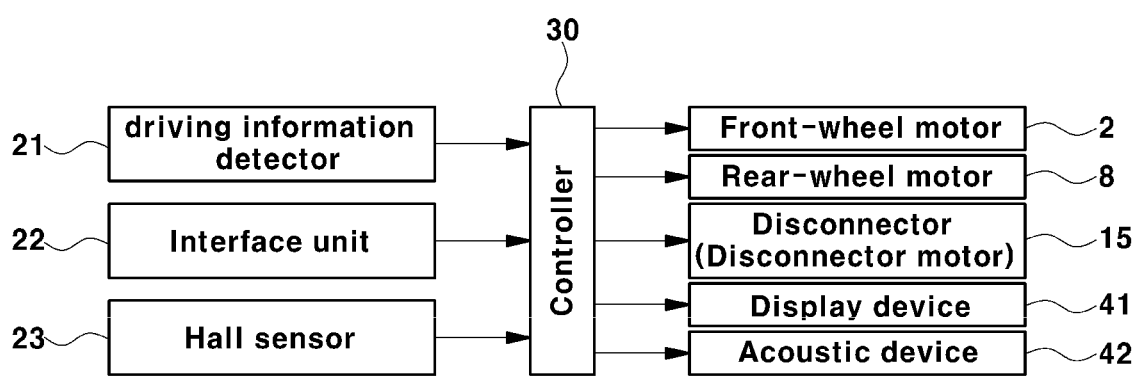
FIG. 4 is a block diagram illustrating the configuration of a virtual shift effect-generating apparatus according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Specific structures or functions described in various forms of the present disclosure are merely for illustrative purposes. Forms according to the concept of the present disclosure may be implemented in various forms, and it should be understood that they should not be construed as being limited to the forms described in the present specification, but include all of modifications, equivalents, or substitutes included in the spirit and scope of the present disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to", should be construed in the same way.

Like reference numerals denote like components throughout the specification. In the meantime, the terminology used herein is for the purpose of describing particular forms only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated components, steps, operations, and/or elements, but do not preclude the presence or addition of one or more other components, steps, operations, and/or elements thereof.

The present disclosure is directed to an apparatus and method that can generate a virtual shift effect in an electric vehicle (EV) without having a multi-stage transmission as in an internal combustion engine vehicle equipped with a multi-stage transmission. To this end, the virtual shift effect-generating apparatus and method are configured to provide a virtual shift effect that simulates the shift effect in an internal combustion engine vehicle by using a disconnector in an electric vehicle.

Hereinafter, a disconnector will be first described in order to aid in understanding the present disclosure.

Recently, a four-wheel drive (4 Wheel Drive, 4WD or All Wheel Drive, AWD) electric vehicle (EV), in which independent driving units are applied to front driving wheels and rear driving wheels, respectively, has been developed. In the 4WD EV, the respective driving units for the front driving wheels and rear driving wheels may be driven independently or together depending on the driving conditions. In addition, the driving units for both the front and rear driving wheels may be battery power-activated motors, and in this case, the 4WD vehicle is an electric vehicle equipped with individual driving motors for front and rear driving wheels, that is, a front-wheel motor and a rear-wheel motor.

In a conventional 4WD electric vehicle, 4WD is performed such that two-wheel drive (2WD), in which driving is performed only via one of the front and rear driving wheels, is adopted as a basic drive mode, and if the driving power becomes insufficient, the other driving wheels in the resting state are additionally driven.

FIG. 1 is a view illustrating a 4WD electric vehicle which is equipped with a front-wheel motor, a rear-wheel motor, and a disconnector, and to which a virtual shift effect-generating apparatus and method is applicable according to the present disclosure. FIG. 2 is a more detailed view illustrating the configuration and component arrangement of a sub-driving wheels (front driving wheels) 1 side power train in the 4WD electric vehicle of FIG. 1.

Referring to FIG. 1, it can be seen that a front-wheel motor (hereinafter referred to as a 'front-wheel motor') for driving the front driving wheels 1 and a rear-wheel motor 8 (hereinafter referred to as a 'rear-wheel motor') for driving the rear driving wheels 7 are mounted in the 4WD electric vehicle. As described above, the 4WD electric vehicle may be driven in any one of 4WD and 2WD modes, and a driving motor and driving wheels that are not used during 2WD mode are predetermined.

In the 4WD electric vehicle equipped with respective front and rear motors 2 and 8, in which the driving wheels used for 2WD is called 'main driving wheels', and the other driving wheels that are not used for 2WD are called 'sub-driving wheels', when the sub-driving wheels are not used during driving of a vehicle (that is, when a vehicle is driven in a 2WD mode), drag loss may occur as reverse driving force is transmitted from the sub-driving wheels 1 to a reducer 3. Therefore, it is desired to inhibit drag loss by blocking the reverse driving force transmitted from the sub-driving wheels 1 during the 2WD mode. To this end, a disconnector 6 may be installed on an axle 5 of the sub-driving wheel 1.

In the following description, between the front and rear driving motors, the motor 8 continuously engaged with the main driving wheels 7 for power transmission is called a 'main-wheel motor' (or a 'first motor') and the motor 2 engaged with the sub-driving wheels 1 via the disconnector 6 for selective interruption of power transmission is called a 'sub-wheel motor' (or a 'second motor').

As illustrated in FIG. 2, the disconnector 6 is a component that is provided on the axle 5 of the sub-driving wheels 1 to engage or disengage the sub-driving wheels 1 and the sub-wheel motor 2 to allow or interrupt power transmission therebetween. In a vehicle equipped with such a disconnector 6, the disconnector 6 installed on the axle 5 is engaged so that power transmission is allowed during 4WD mode, and is disengaged so that power transmission is interrupted during 2WD mode.

FIG. 1 illustrates an electric vehicle equipped with a front wheel disconnector. In the illustrated vehicle, the front driving wheels 1 are sub-driving wheels, and the front wheel disconnector 6 is disposed between the front driving wheel 1 and a component of a front wheel driving system, particularly, on the axle 5 between the front driving wheel 1 and a differential 4 to connect or disconnect the power transmission.

In a vehicle equipped with the front wheel disconnector 6, when the front wheel disconnector 6 is in an engaged state, the vehicle may be driven in a 4WD mode, and when the front wheel disconnector 6 is in a disengaged state, the vehicle may be driven in a rear wheel driving mode. Such a selective engagement or disengagement of the disconnector 6 can regulate power transmission through the axle 5 so that the disconnector 6 can connect or disconnect the sub-driving wheels 1 and the driving system part such as a reducer 3 or the like so as to allow or interrupt power transmission. Here, the drive system parts refer to parts that generate or transmit driving force to drive a vehicle. Such a disconnector 6 may be implemented as a dog clutch.

Referring to FIG. 2, the connection and arrangement of the driving motor (which is a sub-wheel motor) 2, the drive system parts such as the reducer 3 and the differential 4, the disconnector 6, and the wheel 1 are provided, wherein the wheel 1 may be a front driving wheel in a vehicle of FIG. 1 as a sub-driving wheel. In an electric vehicle, the driving motor 2 is driven at a high speed during driving, and the speed of the driving motor 2 is reduced to a speed suitable for vehicle driving by the reducer 3 connected to the driving motor 2, and the rotational force decelerated by the reducer 3 is transmitted to the axle 5 through the differential 4.

During 4WD mode, the rotational force of the sub-wheel motor 2 (front-wheel motor in FIG. 1) is transmitted to an input shaft of the disconnector 6 through the reducer 3 and the differential 4. When the disconnector 6 is in an engaged state, the rotational force transmitted to the input shaft is then transmitted to the sub-driving wheel 1 through an output shaft of the disconnector 6. In the case of 2WD mode in which the sub-wheel motor 2 is not driven, in order to inhibit drag loss occurring due to transmission of reverse driving force from the sub-driving wheel 1 to the reducer 3, the disconnector 6 is disengaged to interrupt the power transmission between the drive system parts, such as the reducer 3, the differential 4, or the like, and the sub-driving wheel 1.

FIG. 3 is a view illustrating the configuration of a disconnector. As illustrated in FIG. 3, the disconnector 6 includes a shaft gear 11 integrally rotatably provided on the input shaft, a hub 12 integrally rotatably provided on the output shaft, a sleeve 13 axially slidably coupled to and rotatable along with the hub 12. Here, the shaft gear 11 may be a spline-shaped gear having teeth formed elongated along the axial direction on the outer circumferential surface thereof, and the hub 12 may also be a spline-shaped gear having teeth formed elongated along the axial direction on the outer circumferential surface thereof.

Here, the sleeve 13 has teeth formed elongated along the axial direction on the inner circumferential surface thereof, and the sleeve 13 is spline-coupled with the shaft gear 11 and the hub 12 disposed therein. The sleeve 13 rotates along with the hub 12 through continuous engagement with the hub. The sleeve may slide in the axial direction from the hub 12 to selectively engage or disengage the shaft gear 11 according to the direction and position of the sliding motion.

In addition, the disconnector 6 further includes a drive mechanism 14 for sliding the sleeve 13 in the axial direction from the hub 12, as illustrated in FIG. 3, wherein the sleeve 13 is engaged with or disengaged from the shaft gear 11 when slid by the drive mechanism 14.

Since the drive mechanism 14 is known in the art, so the configuration thereof will not be illustrated in detail in the drawings. Alternatively, the drive mechanism may be configured to have a screw part (not shown) and a mover screwed therethrough to move forward or backward such that the rotational force of the disconnector motor 15 is converted to a linear moving force through the screw part, the mover, and the like so that a fork 16 moves forward or backward, thereby allowing the sleeve 13 coupled to the fork 15 to slide in the axial direction.

The engagement and disengagement of the disconnector 6 may be performed by a controller (30 in FIG. 4) receiving a sensor signal and controlling the driving of the disconnector motor 15 according to the sensor signal. Here, a Hall sensor (represented by reference numeral '23' in FIG. 4) installed on the disconnector motor 15 may be used. The Hall sensor is a sensor that detects the rotational state of the disconnector motor 15, that is, a measuring device that enables the controller to calculate the linear movement distance, movement position, and movement speed of the disconnector moving part.

The controller may acquire the linear movement distance, movement position (stroke position), and movement speed (stroke speed) of the part moved by the disconnector motor 15 from the signal from the Hall sensor as real-time information, wherein the moving parts are the sleeve 13 and the fork 16 that are moved together. The controller controls the driving of the disconnector motor 15 according to the sensor signal, and controls the current applied to the disconnector motor to control the driving of the disconnector motor 15.

In the disconnector system having such a configuration, the linear movement distance, that is, the stroke position, of the part moved in the axial direction by the disconnector motor 15 for engagement and disengagement of the disconnector 6 is controlled. Specifically, the controller controls the driving of the disconnector motor 15 to control the stroke position. The controller uses a signal from a Hall sensor mounted on the disconnector motor 15 to determine and control the linear movement of the part in the axial direction.

In addition, in the disconnector system, when the shaft gear 11 and the hub 12 are completely disengaged, the disconnector 6 is in a power-disconnected state, and then suffers from the balked state during the engagement of the disconnector 6 by the controller. The balked state of the disconnector 6 means a state in which the teeth of the sleeve 13 and the teeth of the shaft gear 11 are not engaged, but in contact, with each other, and in this state, slip and friction may occur between the teeth due to the speed difference between both ends of the disconnector. In this way, a position at which the sleeve 13 slides in the axial direction from the hub 12 so that the teeth of the sleeve 13 are brought into first contact with the teeth of the shaft gear 11 is generally defined as a meet position or a balking position.

In a typical disconnector system, upon a request to engage the disconnector 6, the controller starts controlling the disconnector motor 15 to engage the disconnector, and then performs the position control to control the driving of the disconnector motor 15 on the basis of the stroke position detected by the Hall sensor until arriving at the meet position.

Further, from the point when arriving at meet position, the controller controls the driving of the disconnector motor 15 through current control. Here, the current control means the controlling of current applied to the disconnector motor 15. Here, the current control is performed to move the sleeve 13 by controlling the current applied to the disconnector motor 15 at the meet position during the engagement process. This current control has the same meaning as force control, and as the current applied to the disconnector motor 15 increases, the force and speed of the disconnector motor 15 (the force and speed of the moving sleeve) increase.

On the other hand, if the moving speed (the stroke speed) of the moving part, i.e. the sleeve 13, moved in the axial direction by the disconnector motor is fast so that the position (stroke position) changes rapidly, noise and impact may be greatly generated. In this way, the electric vehicle to which the disconnector system is applied has the challenge of reducing the impact and noise generated upon the engagement or disengagement of the disconnector.

For example, an engaging impact may occur during the engagement of the disconnector by teeth of the gear parts (sleeve and the shaft gear) of the disconnector being in contact with each other at the meet position. The impact in the disconnector may occur not only upon the engagement, but also upon the disengagement of the disconnector.

According to the present disclosure, the impact upon the above-mentioned engagement and disengagement of the disconnector is used to generate a virtual shift effect. In addition, in the present disclosure, a preset shift pattern map (shift schedule map) is used to generate a virtual shift effect in an electric vehicle. In the present disclosure, the virtual shift effect is a virtual shift effect that simulates an actual shift effect in an internal combustion engine vehicle, that is, a sudden and instantaneous change in vehicle acceleration and a shift impact occurring upon a shift point.

Figure 6:
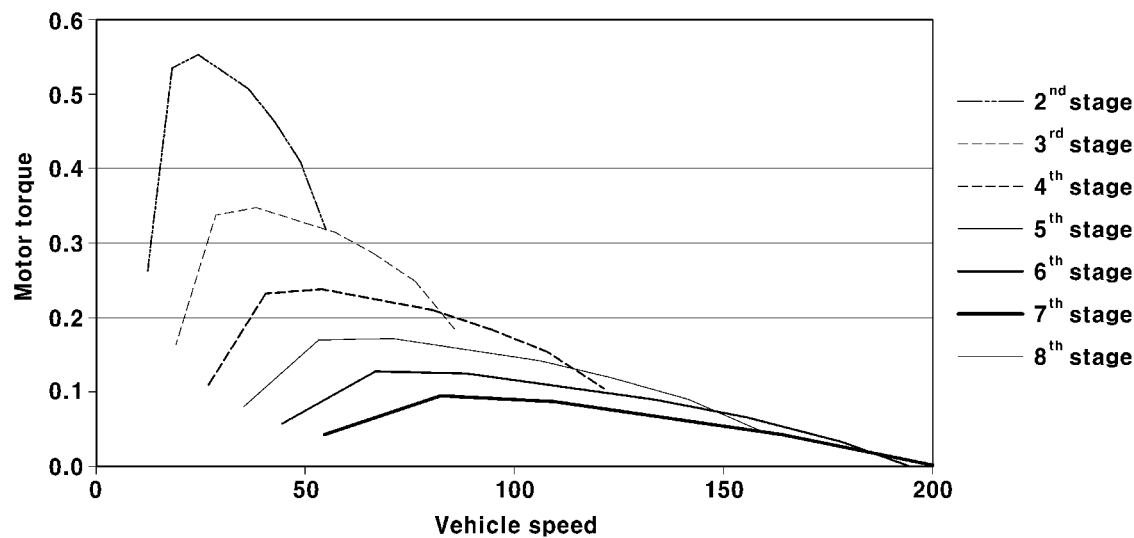
Figure 7:
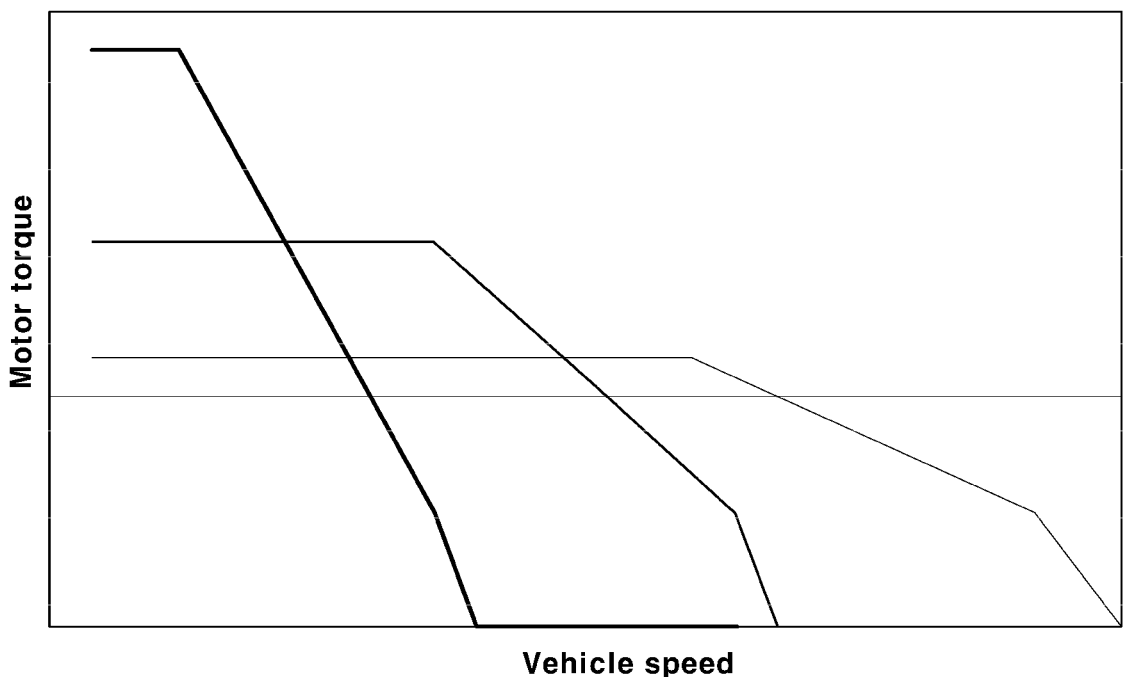
Figure 8:
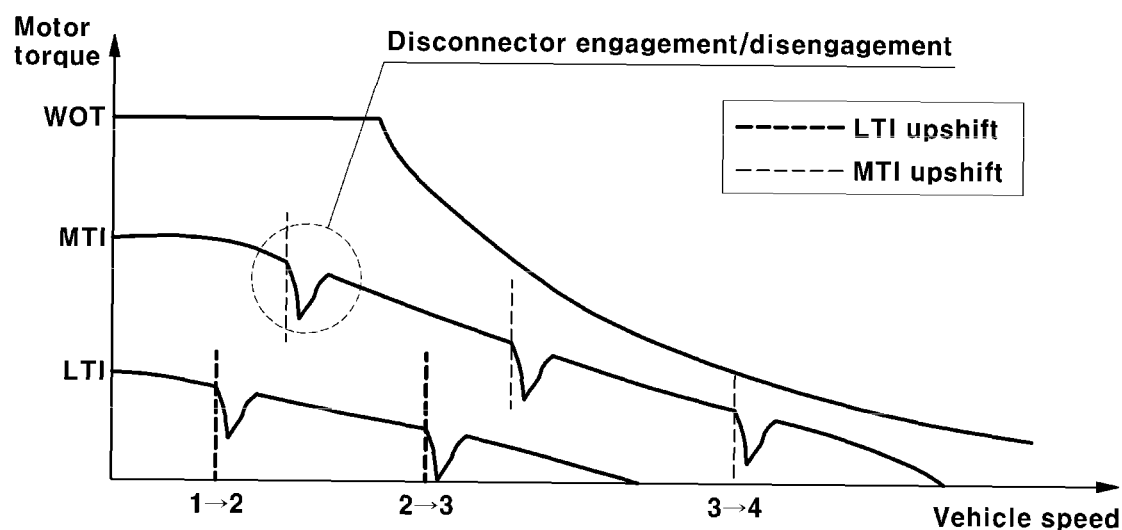

FIG. 4 is a block diagram illustrating the configuration of an apparatus for generating a virtual shift effect according to one form of the present disclosure, and FIGS. 5 to 8 are views illustrating several examples of shift pattern maps for generating a virtual shift effect according to one form of the present disclosure. FIG. 8 also illustrates the time when virtual shifting is performed according to the engagement or disengagement of the disconnector.

As illustrated in FIG. 4, the virtual shift effect-generating apparatus includes a driving information detector 21 for detecting vehicle driving information, a controller 30 that determines a virtual shift point using a shift pattern map on the basis of the vehicle driving information and outputs a control signal for generating the virtual shift effect at the virtual shift point, and a disconnector 6 that is engaged or disengaged according to the control signal from the controller 30 to generate an impact as a virtual shift effect.

Although not illustrated in the drawings, the driving information detector 21 may include an accelerator pedal detection unit that detects an accelerator pedal input value according to a driver's accelerator pedal manipulation, and a vehicle speed detection unit that detects a driving vehicle speed of a vehicle. Here, the accelerator pedal detection unit may be a conventional accelerator pedal sensor (APS) mounted on an accelerator pedal to output an electric signal according to the driver's accelerator pedal manipulation. The vehicle speed detection unit may be configured to include a wheel speed sensor mounted on a driving wheel of a vehicle.

In addition, the driving information detector 21 may further include a detection element for detecting vehicle driving information required to generate a motor torque command in a vehicle. For example, the driving information detector 21 may further include a brake pedal detection unit that detects a brake pedal input value according to a driver's brake pedal manipulation, and a motor speed detection unit that detects a rotational speed (motor speed) of the motor. Here, the brake pedal detection unit may be a conventional brake pedal sensor (BPS) that is mounted on a brake pedal to output an electric signal according to a driver's brake pedal manipulation. The motor speed detection unit may be a known resolver mounted on the front-wheel motor 2 and the rear-wheel motor 8.

On the other hand, the controller 30 may perform a control operation to generate a virtual shift effect, as well as to generate a motor torque command from the vehicle driving information and then operate the front-wheel motor 2 and the rear-wheel motor 8 according to the generated motor torque command. Generating the motor torque command according to the vehicle driving information in the controller 30 of an electric vehicle is a known technique in the art, so a detailed description thereof will be omitted.

Although the controller 30 may be an integrated control element as illustrated in FIG. 4, it may be divided into a plurality of controllers to control the operation of the motors 2 and 8 and the disconnector 6 for driving of a vehicle and additionally, the operation of a display device 41 and an acoustic device 42, which will be described later, according to the control object or function in a vehicle.

In the configuration of the form illustrated in FIG. 4, the controller 30 is provided to determine a virtual target shift stage together with a virtual shift point using a shift pattern map on the basis of vehicle driving information detected by the driving information detector 21. In addition, the controller 30 generates and outputs a control signal for generating a virtual shift effect at the determined virtual shift point.

In addition, the controller 30 may be configured to display the determined virtual target shift stage as a current virtual shift stage on an in-vehicle display device 41 after the disconnector 6 is engaged or disengaged according to the control signal. In addition, the controller 30 may control the operation of the acoustic device 42 to generate and output a virtual sound such as a virtual engine sound in an electric vehicle on the basis of the motor torque command.

In FIG. 4, the Hall sensor 23 is a sensor as a measuring device that may be mounted on the disconnector motor 15 to detect the rotational state of the disconnector motor 15 as described above to allow the controller 30 to calculate the linear movement distance, movement position and movement speed of the moving part of the disconnector. The controller 30 may acquire the linear movement distance, movement position (stroke position), and movement speed (stroke speed) of the parts (sleeve and fork, etc.) moved by the disconnector motor 15 from the signal of the Hall sensor 23 in real time. The controller 30 controls the driving of the disconnector motor 15 on the basis of the signal from the Hall sensor 23 by controlling the current applied to the disconnector motor.

In one form of the present disclosure, the virtual shaft effect-generating apparatus may further include an interface unit 22 through which a driver selects and inputs either an ON or OFF operation of an internal combustion engine mode. The interface unit 22 may be any means so long as it is a means for a driver to select and manipulate the ON or OFF operation of the internal combustion engine mode in a vehicle. For example, the interface unit may be an operation device such as buttons or switches provided in a vehicle, an input device or a touch screen of an audio, video, navigation (AVN) system, or the like.

The interface unit 22 is connected to the controller 30. Accordingly, when there is an ON or OFF operation by the driver, an ON signal or an OFF signal from the interface unit 22 may be input to the controller 30. Then, the controller 30 can recognize the driver's ON/OFF operation input for the internal combustion engine mode. A virtual shift function that generates and implements a virtual shift effect in a driving vehicle is only executed when a driver selects and inputs ON or OFF operation for the internal combustion engine mode through the interface unit 22.

In one form of the present disclosure, the controller 30 may be configured to determine a virtual shift point and a virtual target shift stage from the shift pattern map according to a driver's accelerator pedal input value (APS value) or a motor torque command for generating a driving force of a vehicle along with vehicle speed among vehicle driving information. To this end, a shift pattern map in which a shift point and a shift target stage are set according to vehicle speed and accelerator pedal input values or a motor torque command is input and stored in advance in the controller 30.

Figure 5:
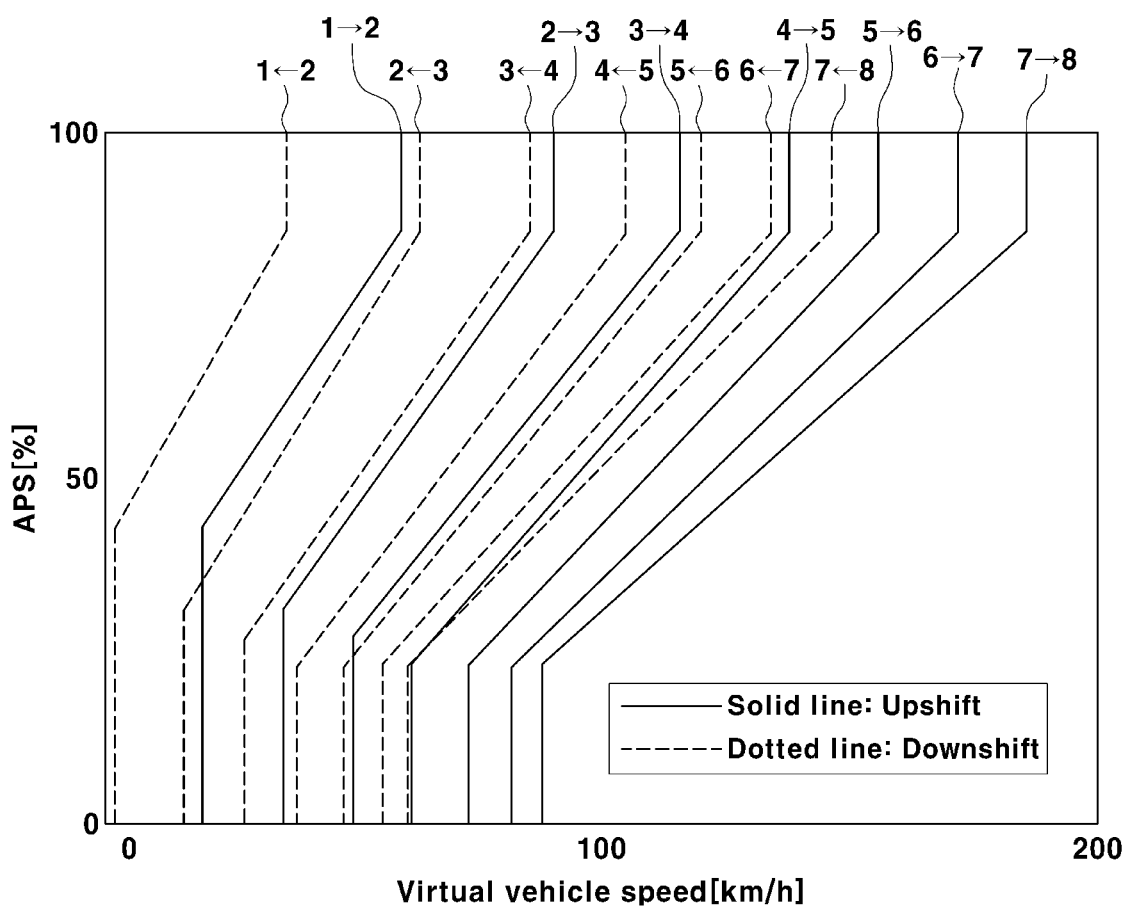
FIGS. 5 to 8 are views illustrating examples of shift pattern maps for generating a virtual shift effect according to one form of the present disclosure.

FIGS. 5 to 8 illustrate several examples of shift pattern maps applicable in one form of the present disclosure. In an exemplary form of the present disclosure, a shift pattern map similar to that used in an internal combustion engine vehicle equipped with a multi-stage transmission may be used, as illustrated in FIG. 5. In the example of FIG. 5, a virtual shift point and a virtual target shift stage are determined from the driver's accelerator pedal input value (APS value) and vehicle speed.

In addition, the shift pattern map illustrated in FIGS. 6 and 7 may be used, and in FIGS. 6 and 7, the vertical axis (Y-axis) may indicate the motor torque (motor torque command), and the horizontal axis (X-axis) may indicate the vehicle speed. In FIG. 8, Wide Open Throttle (WOT) means a state in which a driver fully steps on the accelerator pedal. In the example of FIG. 8, a virtual shift point is divided into Middle Tip In (MTI) and Light Tip In (LTI) on the basis of the accelerator pedal stepping force to indicate the time points at which a virtual MTI upshift and a virtual LTI upshift are performed according to motor torque and vehicle speed.

In the present disclosure, the controller 30 is configured to determine a virtual shift point using a preset shift pattern map based on the driver's accelerator pedal input value (APS value) or motor torque (which may be a command value) and vehicle speed, and then control the engagement or disengagement of the disconnector 6 at the virtual shaft points to generate an impact by the disconnector. When an impact is generated by the disconnector as described above, a virtual shift effect that simulates a sudden and instantaneous change in vehicle acceleration and a shift impact may be generated in a vehicle.

Figure 9:
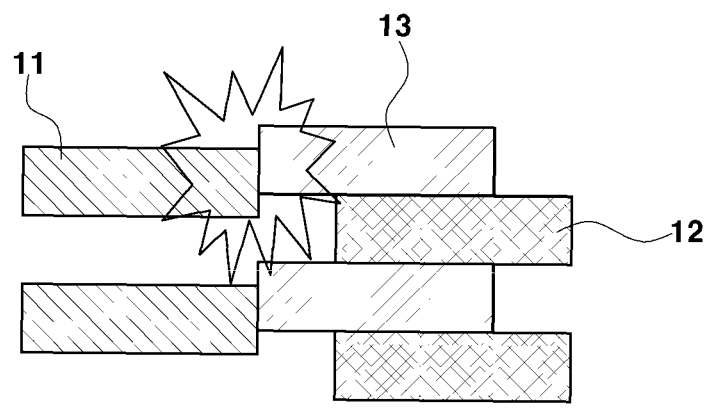
FIG. 9 is a view illustrating a balked state of the disconnector used to generate a virtual shift effect according to one form of the present disclosure.

FIG. 9 is a view illustrating a balked state of the disconnector. In an exemplary form of the present disclosure, a balking during the engagement process of the disconnector may be used to generate a virtual shift effect of a vehicle. For example, in the engagement process of the disconnector 6, when the moving part of the disconnector reaches the meet position, the controller 30 controls the driving of the disconnector motor 15 through current control. Here, the current control means controlling the current applied to the disconnector motor 15.

During the engagement process of the disconnector 6, the sleeve 13 is moved by controlling the current applied to the disconnector motor 15 at the meet position to generate a balked state as illustrated in FIG. 9. Here, the teeth of the sleeve 13 and the teeth of the shaft gear 11 are brought into contact with each other so that an impact occurs from the contact therebetween. As described above, in the present disclosure, the controller 30 generates a balking torque through current control, and a virtual shift effect can be generated by using the balking of the disconnector 6 generated by the balking torque. That is, the control of the disconnector 6 is artificially adjusted to create a shock and a jerk, thereby generating a virtual shift effect.

Figure 10:
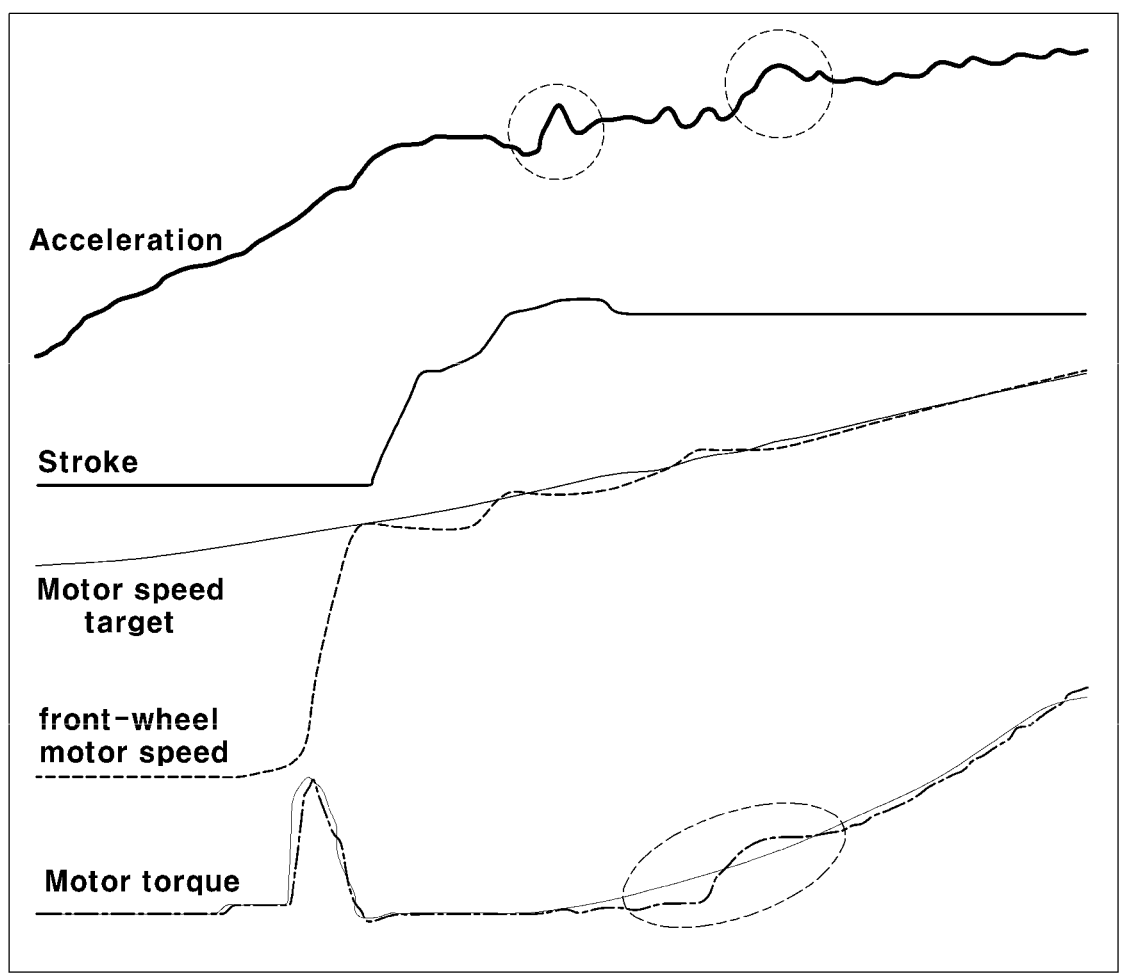
FIG. 10 is a view illustrating the state in which a virtual shift effect is generated using the disconnector according to one form of the present disclosure.
Figure 11:
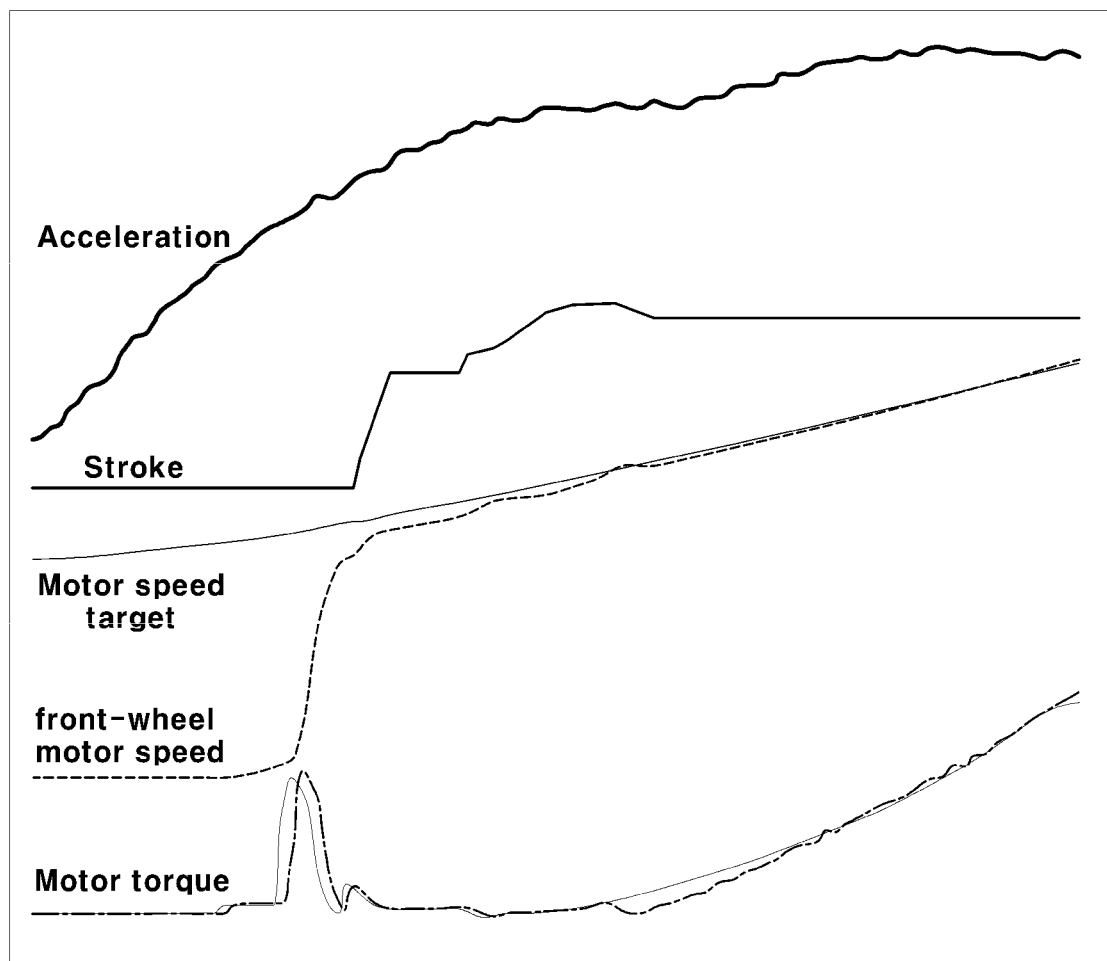
FIG. 11 is a view illustrating a comparative example of an electric vehicle (EV) being driven in a conventional normal EV driving mode.

FIG. 10 is a view illustrating a state in which a virtual shift effect is generated using a disconnector according to one form of the present disclosure, and FIG. 11 is a view illustrating a state when a vehicle is driven in a conventional normal EV driving mode. In FIGS. 10 and 11, the stroke means a pedal stroke, that is, an accelerator pedal stroke, which refers to an accelerator pedal input value (APS value). Compared with FIG. 11, it can be seen that the example of FIG. 10 shows that a virtual shift effect is generated due to the engaging impact of the disconnector. Sudden and instantaneous change in vehicle acceleration occurs due to the engaging impact of the disconnector, and a virtual shift effect that simulates the shift shock can be realized by the change.

FIG. 12 is a flowchart illustrating a process of generating a virtual shift effect according to another form of the present disclosure. Referring to this, the process of generating the virtual shift effect will be described again. During normal driving mode of a vehicle (S1), when a driver switches ON an internal combustion engine mode by manipulating a switch of the interface unit 22, the controller 30 recognizes that the internal engine mode has been manipulated upon receipt of the ON signal (S2). Then, the controller 30 starts the engagement of disengagement control of the disconnector 6 at the virtual shift point according to the shift pattern map, that is, under the set torque (or APS value) and vehicle speed conditions (S3).

At this time, the controller 30 controls the current so that a balking occurs at the disconnector during the engagement of the disconnector 6. As described above, by controlling the current applied to the disconnector motor 15, it is possible to generate and control the balking torque, so that a vehicle acceleration profile that changes instantaneously and rapidly may be generated to produce a virtual shift effect (S4). Further, in addition to generating the virtual shift effect, a virtual shift stage may be displayed through the display device 41, and a virtual sound may be output through the acoustic device 42 (S5).

According to the present disclosure, a virtual shift effect may be generated in an electric vehicle without a transmission as if it were generated in an internal combustion engine vehicle, using the disconnector, thereby allowing the driver to feel the driving sensibility and fun, driving excitement, and the like as in an internal combustion engine vehicle equipped with a multi-stage transmission.

In addition, when the driver selects the internal combustion engine mode in an electric vehicle, the virtual shift effect as in an internal combustion engine vehicle may be generated in association with virtual sounds such as virtual engine sound, thereby providing a sporty shift effect and more realistic driving acceleration to the driver.

In addition, it is possible to enhance the virtual shift effect by allowing the virtual shift stage to be displayed through a display device such as a cluster or an audio, video, and navigation (AVN) system of a vehicle during shifting.

Although various forms of the present disclosure have been described in detail, the scope of the present disclosure is not limited to the above-described forms, and various modifications and changes performed by those skilled in the art using the basic concepts of the present disclosure defined in the following claims are also included in the scope of the present disclosure.

What is claimed is:

1. An apparatus for generating a virtual shift effect in an electric vehicle, where the electric vehicle includes a main-wheel motor for driving main driving wheels and a sub-wheel motor for driving sub-driving wheels, the apparatus comprising:
    a driving information detector configured to detect driving information of the electric vehicle;
    a controller configured to determine a virtual shift point based on the detected driving information and output a control signal for generating a virtual shift effect at the determined virtual shift point; and
    a disconnector provided on an axle of the sub-driving wheels and configured to disengage power transmission between the sub-driving wheels and the sub-wheel motor,
    wherein the disconnector is engaged or disengaged based on the control signal output from the controller, and is configured to generate an impact occurring upon the engagement or disengagement of the disconnector as the virtual shift effect.

2. The apparatus according to claim 1, wherein the driving information of the electric vehicle comprises:
    at least one of an accelerator pedal input value detected by an accelerator pedal detector or a motor torque command generated by the controller to generate a driving force of the electric vehicle; and
    a vehicle speed detected by a vehicle speed detector.

3. The apparatus according to claim 1, wherein the controller is configured to determine a virtual shift point using a preset shift pattern map based on the detected driving information of the electric vehicle.

4. The apparatus according to claim 3, wherein the controller is configured to:
    determine a target shift stage using the preset shift pattern map based on the detected driving information of the electric vehicle; and
    display the determined target shift stage as a current virtual shift stage through an in-vehicle display device after the disconnector is engaged or disengaged.

5. The apparatus according to claim 1, further comprising:
    an interface unit configured to enable a driver to switch an internal combustion engine mode,
    wherein the controller is configured to output the control signal for generating the virtual shift effect when the internal combustion engine mode is switched ON by the driver.

6. A method of generating a virtual shift effect in an electric vehicle, where the electric vehicle includes a main-wheel motor for driving main driving wheels and a sub-wheel motor for driving sub-driving wheels, the method comprising:
    collecting, by a controller, driving information of the electric vehicle;
    determining, by the controller, a virtual shift point based on the collected driving information and outputting a control signal for generating a virtual shift effect at the determined virtual shift point; and
    selectively allowing, by a disconnector provided on an axle of the sub-driving wheels, power transmission between the sub-driving wheels and the sub-wheel motor based on the control signal output from the controller, and using an impact occurring upon an engagement or a disengagement of the disconnector as the virtual shift effect.

7. The method according to claim 6, wherein the driving information of the electric vehicle comprises:
    at least one of an accelerator pedal input value detected by an accelerator pedal detector or a motor torque command generated by the controller to generate a driving force of the electric vehicle; and
    a vehicle speed detected by a vehicle speed detector.

8. The method according to claim 6, wherein the controller is configured to determine the virtual shift point using a preset shift pattern map based on the collected driving information of the electric vehicle.

9. The method according to claim 8, wherein outputting the control signal for generating the virtual shift effect further comprises:
    determining, by the controller, a target shift stage using the shift pattern map based on the collected driving information of the electric vehicle; and
    displaying the determined target shift stage as a current virtual shift stage through an in-vehicle display device after the disconnector is engaged or disengaged.

10. The method according to claim 6, further comprising:
    switching ON an internal combustion engine mode through a driver's manipulation of an interface unit,
    generating, by the controller, a control signal for generating the virtual shift effect when the internal combustion engine mode is switched ON by the driver.

11. The apparatus according to claim 1, wherein the controller generates a balking torque through current control to balk the disconnector and the virtual shift effect is generated by using the balking of the disconnector generated by the balking torque.

* * * * *